Aug. 24, 1937.   G. E. BULLOCK   2,090,830
PUMP
Filed April 20, 1936

INVENTOR
GILES E. BULLOCK
BY
ATTORNEY

Patented Aug. 24, 1937

2,090,830

UNITED STATES PATENT OFFICE 2,090,830

PUMP

Giles E. Bullock, Rochester, N. Y.

Application April 20, 1936, Serial No. 75,329

11 Claims. (Cl. 221—77)

This invention relates to air pumps and has for one of its objects to provide a novel mounting for the pump cylinder thereof.

Another object of this invention is to provide the mounting of the pump cylinder with novel sealing means.

A further object of this invention is to provide the piston of the pump with a novel form of spreader for the cup thereof.

All these and other objects and attendant advantages of this invention will become more readily apparent from the detailed description thereof, reference being had to the accompanying drawing in which Figure 1 is a partial sectional view and side elevation of the air pump and its mounting.

In the several figures of the drawing like reference numerals indicate like parts.

Figure 1:
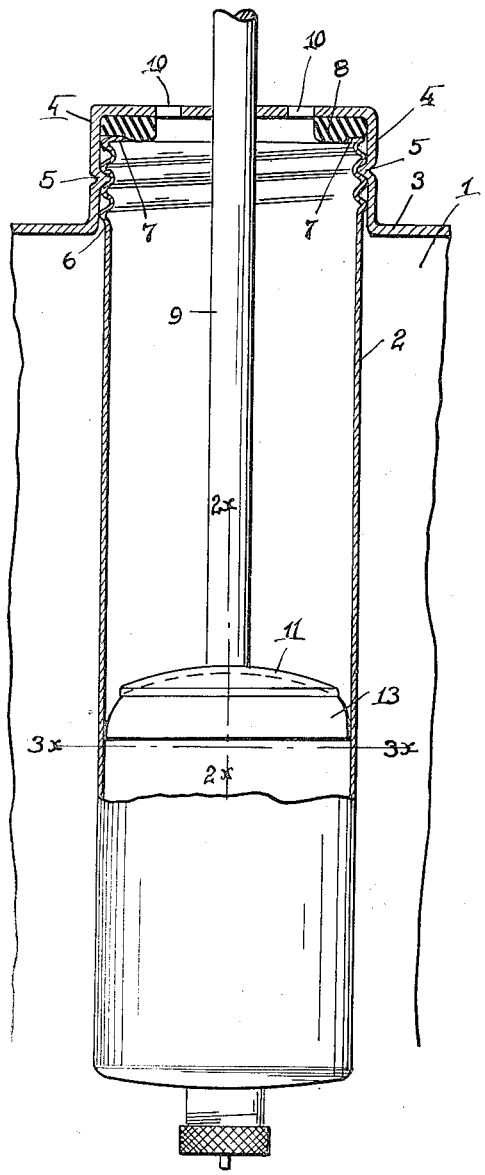
Figure 2:
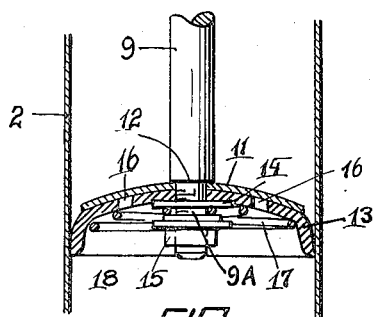
Figure 2 is a detail sectional view of the piston of the air pump, the section being taken on the line 2x—2x of Figure 1.
Figure 3:
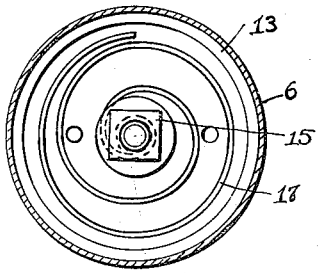
Figure 3 is a horizontal sectional view of the pump cylinder taken on the line 3x—3x of Figure 1.

The air pump, its mounting and piston construction forming the subject matter of our present invention is especially adapted for use in sprayers and in the form illustrated in Figure 1 is mounted in a pressure tank in which air is compressed for spraying purposes.

This tank, indicated by reference numeral 1 is constructed so as to withstand considerable pressure and the pump 2 is mounted in the tank head or closure member 3 of the tank which, for this purpose, is provided with an integrally formed inverted cup shaped cylinder head 4. In the wall of this cup shaped cylinder head are provided suitable lugs 5, 5 which are arranged in the form of a mutilated thread in order to receive the threaded end of the cylinder 6. The thread in the end of the cylinder is preferably rolled into the wall thereof and the end of the cylinder is turned inwardly to provide the inwardly projecting sealing flange 7 thereon.

Between the inwardly flanged end of the cylinder and the end of the inverted cup shaped cylinder head is provided the compressible gasket 8 so that by threading the cylinder into the cylinder head 4 the gasket is compressed and seals the end of the cylinder into the cylinder head and in turn the inside of the tank.

In all pump mountings of this kind the cylinder is usually flanged outwardly at the end so that an additional nut or other clamping member is necessary to clamp the outwardly projecting flange against the gasket within its head. In our present invention this has been eliminated by providing the inwardly projecting flange whereby the construction of the cylinder mounting is simplified and its cost of manufacture considerably reduced.

The seal formed between the inwardly projecting flange 7 and the gasket 8 is furthermore extremely efficient in that it compresses the gasket in the inner edge of the cylinder head where the gasket is firmly held in place. The non-compressed portion of the gasket will thus overhang into the inside of the cylinder and provide an additional seal around the edge of the flange 7.

The piston of the air pump has its piston rod 9 passing thru a suitable hole in the cylinder head 4 and suitable air ports 10, 10 are provided in the head for the admission of air into the pump.

The piston proper comprises the circular washer 11 which is preferably dished and rests against the shoulder 12 provided between the end of the piston rod 9 and its threaded extension 9A. The cup 13 of the piston, which may be made of leather or other suitable material, rests against the under side of the washer 11 and its central portion is clamped thereto by means of the washer 14 which is forced against the cup by the clamping nut 15.

The remaining portion of the bottom of the cup 13 of the piston is yieldingly held against the washer 11 and the wall of the cup which overhangs the washer 11 is held yieldingly expanded against the inside wall of the cylinder. In this way the cup is normally held in contact with the cylinder wall so as to prevent the escape of air past it at the beginning of the downward stroke of the piston; that is until the pressure of the air built up in the cylinder by the movement of the piston is sufficient to force and additionally expand the wall of the cup against the cylinder wall.

Air is admitted into the cylinder below the piston on the return stroke of the piston thru one or more air holes 16 provided in the bottom of the cup 13. These air holes are located below the washer 11 so that when the bottom of the cup is yieldingly held against the washer, these air holes are normally held closed.

The member which normally holds the bottom of the cup 13 against the washer 11 and the wall of the cup against the wall of the cylinder comprises a helical spring 17. This spring is formed flat and its small center opening is telescoped over the threaded extension 9A of the piston rod against the washer 14 and is held clamped between it and the washer 18 when the washer 14 is forced against the cup 13 by the clamping nut 15. As the helical spring is forced into the cup, the large coils of this spring engage the inner wall of the cup so that by the time the spring is clamped in place the helical spring has assumed a conical shape in which the coils tend to yieldingly hold the bottom of the cup against the washer 11 and the wall of the cup against the wall of the cylinder beyond the washer 11.

A uniform outward pressure is thus evenly exerted around the inside of the cup by the helical spring 17 with the result that the cup is normally held against the washer 11 and its air openings 16 held closed thereby while the wall of the cup is held normally and uniformly expanded against the cylinder wall. One spring member thus serves to exert the combined upward and outward pressure necessary to normally and yieldingly hold the cup of the piston in its proper position on the end of the piston rod.

On the upstroke of the piston when air is to be admitted under the piston for the compression thereof on the downstroke, the upward movement of the piston slightly collapses the cup against the pressure of the conically helical spreading spring so that the air holes 16 are exposed on the under side of the washer 11 and air can pass thru the piston to fill the cylinder for the compression thereof on the return downstroke of the piston.

I claim:

1. A pump having a sheet metal cylinder open at one end and closed at the other end, an inwardly projecting concentric flange formed at the open end of said cylinder to reduce the opening thereinto, a head detachably surrounding the outside of the open end of said cylinder, a sealing washer compressed between said flange and said head, a piston movable within said cylinder having substantially the same diameter as the reduced end of said cylinder to permit its insertion thereinto and flexible expanding means projecting from said piston to engage the wall of the cylinder in its movement between the closed end and the inwardly projecting flange surrounding the open end thereof.

2. A pump adapted to be mounted in a pressure tank having a head, said pump comprising a sheet metal cylinder having an open end, a closure member formed in said head for engagement with the open end of said cylinder, an inwardly projecting flange formed at the open end of said cylinder so as to reduce the opening thereinto, a sealing washer compressed between said flange and said closure member, a piston movable within said cylinder having substantially the same diameter as the reduced end of said cylinder to permit its insertion thereinto and flexible expanding means projecting from said piston to engage the wall of the cylinder in its movement between the closed end and the inwardly projecting flange surrounding the open end thereof.

3. A pump adapted to be mounted in a pressure tank having a head with a cap provided centrally of the head, said pump comprising a sheet metal cylinder having an open end, said open end of said cylinder having a flange projecting inwardly thereof so as to reduce the opening thereinto, a sealing washer within said cap, means for locking the open end of said cylinder into said cap with said sealing washer compressed between said flange and said cap, a piston movable within said cylinder having substantially the same diameter as the reduced end of said cylinder to permit its insertion thereinto and flexible expanding means projecting from said piston to engage the wall of the cylinder in its movement between the closed end and the inwardly projecting flange surrounding the open end thereof.

4. A pump adapted to be mounted in a pressure tank having a head with a cap provided centrally of the head, said pump comprising a sheet metal cylinder having an open end, thread means formed around the outside of the open end of said cylinder adapted to be threaded into said cap, a sealing flange extending inwardly of the open end of said cylinder so as to reduce the opening therein, a sealing washer clamped between said cap and said sealing flange, a piston movable within said cylinder having substantially the same diameter as the reduced end of said cylinder to permit its insertion thereinto and flexible expanding means projecting from said piston to engage the wall of the cylinder in its movement between the closed end and the inwardly projecting flange surrounding the open end thereof.

5. A pump comprising a cylinder and a piston with a leather cup carried by said piston and a radially expanding helical spring member on the inside of said cup to normally keep said cup expanded against said cylinder.

6. A pump comprising a cylinder and a piston with a leather cup carried by said piston and a conically shaped helical spring member on the inside of said cup to normally keep said cup longitudinally and radially expanded against said cylinder.

7. A pump comprising a cylinder and a piston with a flexible cup carried by said piston, a washer at the back of said cup, a substantially helical spring member fastened to the inside of said cup against the inner wall thereof to normally keep said cup longitudinally expanded against said washer and radially expanded against said cylinder.

8. A pump having a cylinder and a piston with a flexible cup carried by said piston, a dished washer carried by said piston to reinforce the back of said leather cup, a substantially conically shaped helical spring member carried by said piston within said leather cup so as to engage the outwardly flaring inner wall of said cup and normally keep the cup longitudinally expanded against the washer and radially expanded against said cylinder.

9. A pump having a cylinder with a piston mounted on a piston rod and comprising a washer carried by said piston rod, a leather cup held against said washer, a conically shaped spiral spring carried by said piston rod within said leather cup to engage the bottom of said cup and hold it longitudinally against said washer and engage and radially expand the wall of said cup to hold it concentric against the wall of the cylinder.

10. A pump having a cylinder with a piston mounted on a piston rod within the cylinder, said piston comprising a rigid washer, a flexible cup having an air opening in the bottom thereof locked to said washer centrally thereof, a spiral spring member clamped to the inside of said cup so as to engage the bottom and inner wall of said cup and yieldingly hold the bottom of the cup against the washer to normally hold the air opening in the cup closed by said washer and permit it to open on the flexing of the cup against the spring away from the washer.

11. A pump having a cylinder and a piston comprising an imperforate washer, a flexible cup having an inlet in the bottom thereof fastened to said washer to have the portion of the bottom of the cup with the inlet movable away from said washer, a spiral spring member within said flexible cup to longitudinally expand said flexible cup and normally hold its bottom yieldingly against said washer to have said washer close the inlet into said cup, said spiral spring member also expanding said flexible cup radially against the wall of said cylinder.

GILES E. BULLOCK.